(12) United States Patent
Sejimo

(10) Patent No.: US 8,067,910 B2
(45) Date of Patent: Nov. 29, 2011

(54) BRUSHLESS MOTOR

(75) Inventor: Isamu Sejimo, Matsumoto (JP)

(73) Assignee: Seiko Epson Corporation (JP)

( * ) Notice: Subject to any disclaimer, the term of this patent is extended or adjusted under 35 U.S.C. 154(b) by 528 days.

(21) Appl. No.: 12/247,416

(22) Filed: Oct. 8, 2008

(65) Prior Publication Data

US 2009/0121663 A1 May 14, 2009

(30) Foreign Application Priority Data

Nov. 14, 2007 (JP) ................. 2007-295195

(51) Int. Cl.
*H02P 6/00* (2006.01)

(52) U.S. Cl. ................. 318/400.01; 318/400.32

(58) Field of Classification Search ............ 318/400.01, 318/400.32, 599, 811
See application file for complete search history.

(56) References Cited

U.S. PATENT DOCUMENTS

| 3,745,435 | A | * | 7/1973 | Futagawa et al. | 318/400.41 |
| 4,347,536 | A | * | 8/1982 | Miyashita et al. | 360/271.7 |
| 4,578,606 | A | * | 3/1986 | Welterlin | 310/68 R |
| 5,349,257 | A | * | 9/1994 | Hernden | 310/68 B |
| 5,461,293 | A | * | 10/1995 | Rozman et al. | 318/603 |
| 5,761,375 | A | * | 6/1998 | Naito | 388/806 |
| 6,008,603 | A | * | 12/1999 | Jones et al. | 318/400.32 |

FOREIGN PATENT DOCUMENTS

JP 03-230791 10/1991

* cited by examiner

*Primary Examiner* — Rina Duda
(74) *Attorney, Agent, or Firm* — Harness, Dickey & Pierce, P.L.C.

(57) ABSTRACT

A brushless motor includes: a permanent magnet; a driving coil moving relative to the permanent magnet; a sensor coil disposed to the permanent magnet so as to generate a sensor coil induced voltage having a same phase of a driving coil induced voltage generated in the driving coil; and a driving circuit applying a driving voltage to the driving coil, the driving voltage having a same phase of the sensor coil induced voltage generated in the sensor coil.

6 Claims, 7 Drawing Sheets

BRUSHLESS MOTOR

The entire disclosure of Japanese Patent Application No. 2007-295195, filed Nov. 14, 2007 is expressly incorporated by reference herein.

BACKGROUND

1. Technical Field

The present invention relates to a brushless motor having no commutator for detecting a rotational position of the motor.

2. Related Art

A brushless motor is used that has a semiconductor switch instead of a brush serving as a commutator because of problems of maintenance and sparks. Particularly, a brushless motor is known that has no encoders for detecting a rotational position of the motor and sensors utilizing a hole effect.

FIG. 11 is a block diagram of a motor driving portion and a motor driving circuit of a related art motor as an example of such brushless motor.

As shown in FIG. 11, a brushless motor (dc motor without commutator) 1 includes a motor driving portion 2 and a driving circuit 3. The driving circuit 3 includes an induced voltage detection portion (back electromotive force detection unit) 4, a phase shift portion (pulse delay unit) 5, a driving pulse generating logic portion (logic pulse generating unit) 6, and a switching circuit portion (stator winding power supply unit) 7.

The induced voltage detection portion 4 detects an induced voltage generated in a non-energized interval of each of driving coils (stator windings) 2a of the motor driving portion 2, and outputs a timing of a zero-cross point of an induced voltage waveform in each phase as a pulse train. The phase shift portion 5 shifts a phase at a timing at which an output pulse train is applied to each driving coil 2a from the induced voltage detection portion 4. The driving pulse generating logic portion 6 generates a driving pulse for each phase, i.e., each coil 2a based on the output pulse train from the phase shift portion 5. The switching circuit portion 7 properly supplies a driving voltage to each driving coil 2a based on the driving pulse. Refer to JP-A-3-230791 (claims 3 and 4, and FIG. 1).

The brushless motor utilizing an induced voltage without using a sensor, however, has the following problems. It is difficult to use the brushless motor in a single-phase full-wave drive in which non-energized interval does not occur in a coil. The driving system is cumbersome, so that design costs increases because the brushless motor includes a unit for detecting a zero-cross point, an arithmetic portion of a phase shift, and the like. Additionally, a method detecting only a zero-cross point in a non-energized interval from an induced voltage has a problem in that an induced voltage waveform similar to a sine wave is not effectively used.

SUMMARY

An advantage of the present invention is to provide a brushless motor that can be applied in the case of no presence of non-energized interval, and can be efficiently operated with low vibrations and noises.

A brushless motor of the invention includes: a permanent magnet; a driving coil moving relative to the permanent magnet; a sensor coil disposed to the permanent magnet so as to generate a sensor coil induced voltage having a same phase of a driving coil induced voltage generated in the driving coil; and a driving circuit applying a driving voltage to the driving coil, the driving voltage having a same phase of the sensor coil induced voltage generated in the sensor coil.

According to the brushless motor, a signal having the same phase of the driving voltage that should be applied to the driving coil can be taken from the sensor coil induced voltage since the driving coil and the sensor coil are disposed such that induced voltages are generated in both coils with the same phase. Utilizing the sensor coil induced voltage can omit the phase shift portion having been necessary in related art. Additionally, detecting a zero-cross point having been necessary in related art can be omitted since the sensor coil is always in a non-energized state. Further, the brushless motor can be more efficiently operated with low vibrations and low noises as compared with a case of using a rectangular waveform drive since it is possible to reflect the waveform, similar to a sine wave, of the sensor coil induced voltage to the driving voltage of the driving coil through the driving circuit.

In this case, the driving coil may have m pole and is energized by a p-phase driving method where $p \geq 1$, and $m \geq p$. The sensor coil induced voltage may include a plurality of sensor coil induced voltages, and the sensor coil may have n poles and generate p number of the sensor induced voltages where $m \geq n \geq p$. The driving coil induced voltage may include a plurality of driving coil induced voltages and the sensor coil may be disposed such that each phase of the p number of the sensor coil induced voltages is equal to a phase of one of the p number of driving coil induced voltages generated in the driving coil. The driving circuit may apply the driving voltage having the same phase of the sensor coil induced voltage to the driving coil such that each of the sensor coil induced voltages has the same phase of one of the driving coil induced voltages. According to the brushless motor, the same effect described above can be achieved also in a driving method with multiple phases since the sensor coil is disposed such that the driving coil induced voltage generated in the driving coil has a same phase of the sensor coil induced voltage. The driving coil is driven by each phase according to the number of phases.

In this case, a pole number of the permanent magnet may be double a pole number of the sensor coil. The pole of the permanent magnet corresponds one-by-one to each pole of the sensor coil, resulting in the sensor coil induced voltage being smooth. As a result, the brushless motor can be more efficiently operated with low vibrations and low noises.

In this case, the driving circuit may apply a driving voltage having a same phase and a nearly same waveform of the sensor coil induced voltage to the driving coil. Since the induced voltages of the driving coil and the sensor coil have the same phase and waveform, a driving voltage proper to the driving coil can be applied by reflecting the waveform of the sensor coil induced voltage to the driving voltage of the driving coil through the driving circuit. As a result, the brushless motor can be more efficiently operated with low vibrations and low noises as compared with a case of using a rectangular waveform drive.

In this case, the driving circuit may include a pulse width modulation unit to pulse-width-modulation (PWM) control the sensor coil induced voltage. The induced voltage having a waveform of a nearly sine wave is PVVM-controlled. As a result, the brushless motor can be more efficiently operated with low vibrations and low noises.

In this case, a pole number of the sensor coil may be less than a pole number of the driving coil. In addition to the above-described effects, costs can be reduced with reduction of materials used for electromagnetic yokes and windings since the number of sensor coils is reduced.

In this case, a winding number of the sensor coil may be less than a winding number of the driving coil. In addition to the above-described effects, costs can be reduced with reduction of materials used for windings since the number of windings of the sensor coil is reduced.

It is noted that this summary of the invention does not describe all of the features necessary for the invention. The sub-combinations of the features mentioned above also constitute part of the invention.

BRIEF DESCRIPTION OF THE DRAWINGS

The invention will be described with reference to the accompanying drawings, wherein like numbers reference like elements.

DESCRIPTION OF EXEMPLARY EMBODIMENTS

Embodiments of the invention are described with reference to the accompanying drawings.

First Embodiment

Figure 1:
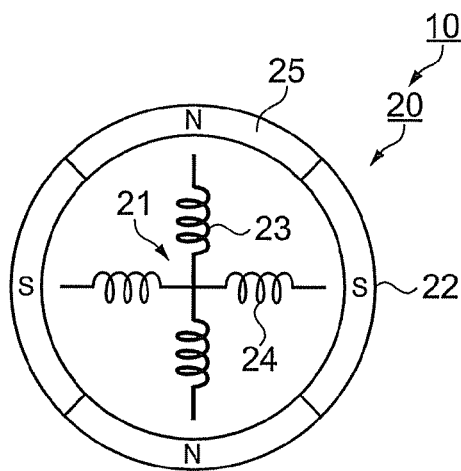
FIG. 1 is a schematic view of a motor driving portion in a first embodiment.
Figure 2:
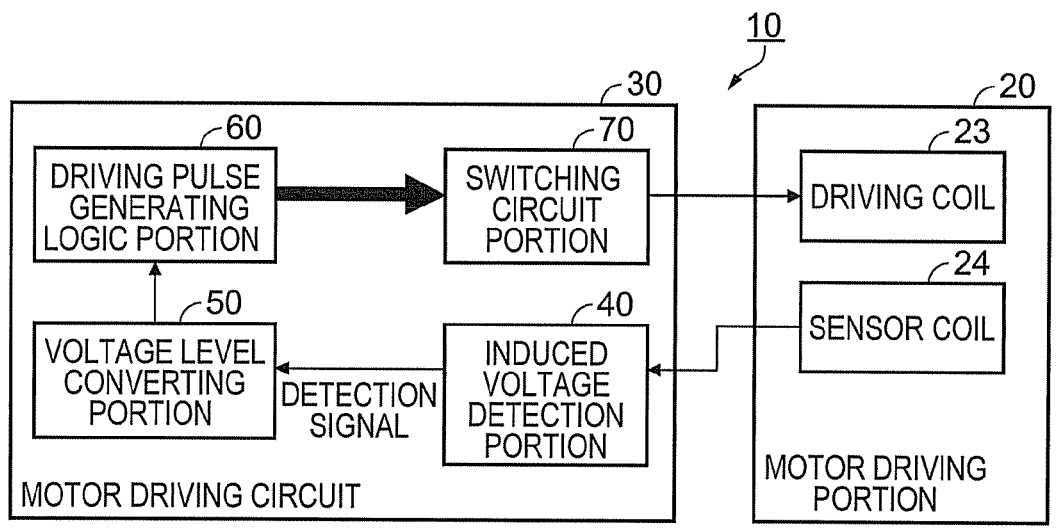
FIG. 2 is a block diagram of the motor driving portion and a motor driving circuit.

FIG. 1 is a schematic view of a motor driving portion 20 of a brushless motor 10 of a first embodiment of the invention. FIG. 2 is a block diagram of the motor driving portion 20 and a motor driving circuit 30. As shown in FIG. 1, the motor driving portion 20 includes a stator 21 and a rotor 22. The rotor 22 is disposed so as to surround the stator 21. The rotor 22 rotates outside the stator 21. Thus, the motor is classified as an outer rotor type.

While the outer rotor type motor is described in the embodiment, the invention can also be applied to an inner rotor type motor, a plane rotor type motor, and the like. In addition, the invention also can be applied to a multiple phase drive other than the single-phase full-wave drive mainly described in the embodiment.

The stator 21 includes a driving coil 23 and a sensor coil 24. The pole number of the driving coil 23 is equal to that of the sensor coil 24. The rotor 22 is provided with a permanent magnet 25 having poles twice as many as those of the driving coil 23. Here, the driving coil 23 and the sensor coil 24 move relative to the permanent magnet 25.

The sensor coil 24 is disposed to the permanent magnet 25 so as to generate a sensor coil induced voltage having a same phase of a driving coil induced voltage generated in the driving coil 23.

The operation of the brushless motor 10 is described below.

In FIGS. 1 and 2, the driving coil 23 is bi-directionally energized with a single-phase full-wave by the motor driving circuit 30. The sensor coil 24 generates a sensor coil induced voltage, e.g., a sine wave output, induced by a relative movement of the sensor coil 24 and the permanent magnet 25.

As shown in FIG. 2, the motor driving circuit 30 includes an induced voltage detection portion 40, a voltage level converting portion 50, a driving pulse generating logic portion 60 and a switching circuit portion 70.

The induced voltage detection portion 40 filters an induced voltage generated by the sensor coil 24 to detect a necessary voltage and outputs a detection signal.

Figure 3:
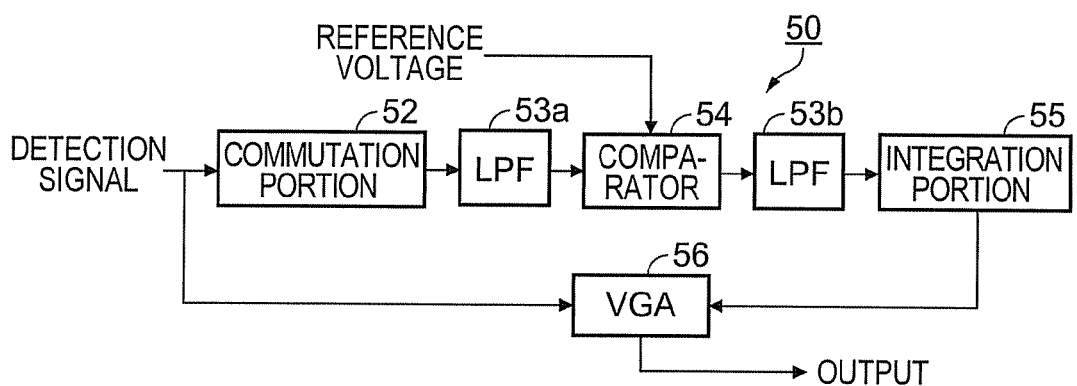
FIG. 3 is a block diagram of a voltage level converting portion.

In the voltage level converting portion 50, the voltage level of the detection signal outputted from the induced voltage detection portion 40 is properly converted so as to meet a driving pulse generating logic portion 60. FIG. 3 shows an exemplary block diagram of the voltage level converting portion 50.

First, the detection signal from the induced voltage detection portion 40 is commutated by a commutation portion 52. Then, the commutated detection signal is smoothed by a low pass filter (LPF) 53a. The smoothed detection signal and a reference voltage set to meet the structure of the driving pulse generating logic portion 60 are compared by a comparator 54. The detection signal is smoothed again in a low pass filter 53b and the smoothed detection signal is integrated by an integration portion 55. A variable gain amplifier (VGA) 56 regulates the voltage level of the detection signal based on a voltage level outputted from the integration portion 55.

The driving pulse generating logic portion 60 generates a driving pulse to drive the brushless motor 10 based on the converted signal.

When the driving pulse generating logic portion 60 has a pulse width modulation (PWM) unit 62, a waveform, similar to a sine wave, of an induced voltage can be utilized.

Figure 4:
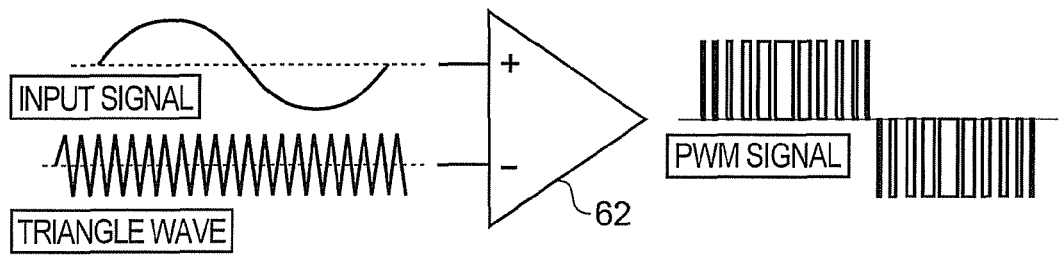
FIG. 4 is a conceptual view of a pulse width modulation unit.

FIG. 4 shows an exemplary conceptual view of the pulse width modulation unit 62. The pulse width modulation unit 62 can compare a triangle wave serving as a reference and an input signal outputted from the voltage level converting portion 50 to generate a PWM signal.

Figure 5:
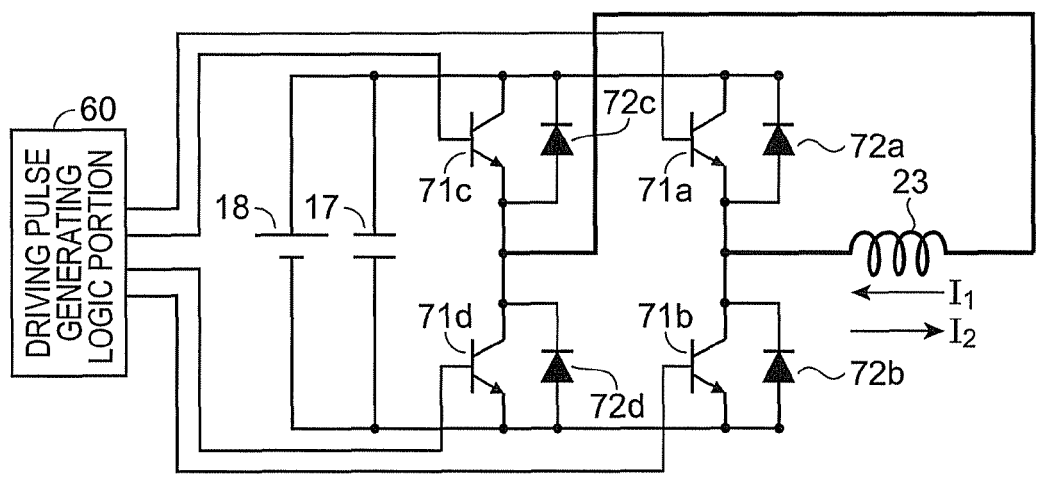
FIG. 5 is a circuit diagram of a switching circuit portion.

The switching circuit portion 70 properly supplies a driving voltage to the driving coil 23 based on a driving pulse outputted from the driving pulse generating logic portion 60. FIG. 5 shows an exemplary circuit diagram of the switching circuit portion 70.

In FIG. 5, transistors 71a, 71b, 71c, and 71d are turned ON/OFF in response to an output from the driving pulse generating logic portion 60 to perform a single-phase full-wave drive.

When the transistors 71c and 71b are turned ON and the transistors 71a and 71d are turned OFF, a current flows in the driving coil 23 in a direction $I_1$. In contrast, when the transistors 71a and 71d are turned ON and the transistors 71b and 71c are turned OFF, a current flows in the driving coil 23 in a direction $I_2$.

Diodes 72a, 72b, 72c, and 72d protect the transistors 71a, 71b, 71c, and 71d from a surge voltage mostly generated at the ON/OFF switching timings of the transistors 71a, 71b, 71c, and 71d.

As for the start-up, it is necessary to utilize, for example, a method disclosed in JP-UM-A-62-54574. In the method, the initial position of a rotor is set by performing a typical energizing switching, and then the rotational speed of the rotor is increased to exceed a predetermined value capable to sufficiently achieve an induced voltage.

The first embodiment demonstrates the following effects.

(1) A signal having the same phase of a driving voltage that should be applied to the driving coil 23 can be taken from a sensor coil induced voltage since the driving coil 23 and the sensor coil 24 are disposed such that induced voltages are generated in both coils with the same phase. Utilizing the sensor coil induced voltage can omit the phase shift portion having been necessary in related art. Additionally, detecting a zero-cross point having been necessary in related art can be omitted since the sensor coil 24 is always in a non-energized state. Further, the brushless motor can be more efficiently operated with low vibrations and low noises as compared with a case of using a rectangular waveform drive since it is possible to reflect the waveform, similar to a sine wave, of the sensor coil induced voltage to the driving voltage of the driving coil 23 through the motor driving circuit 30.

(2) The pole of the permanent magnet 25 corresponds one-by-one to each pole of the sensor coil 24, resulting in the sensor coil induced voltage being smooth. As a result, the brushless motor can be more efficiently operated with low vibrations and low noises.

(3) The brushless motor can be more efficiently operated with low vibrations and low noises as compared with a case of using a rectangular waveform drive.

(4) When the sensor coil 24 and the driving coil 23 are designed on the same coil design, an induced voltage generated in the sensor coil 24 has the same phase and waveform of that generated in the driving coil 23. A driving voltage proper to the driving coil 23 can be applied by reflecting the waveform of the sensor coil induced voltage of the sensor coil 24 to the driving coil 23 through the motor driving circuit 30. As a result, the brushless motor can be further more efficiently operated with low vibrations and low noises as compared with a case of using a rectangular waveform drive.

Second Embodiment

Figure 6:
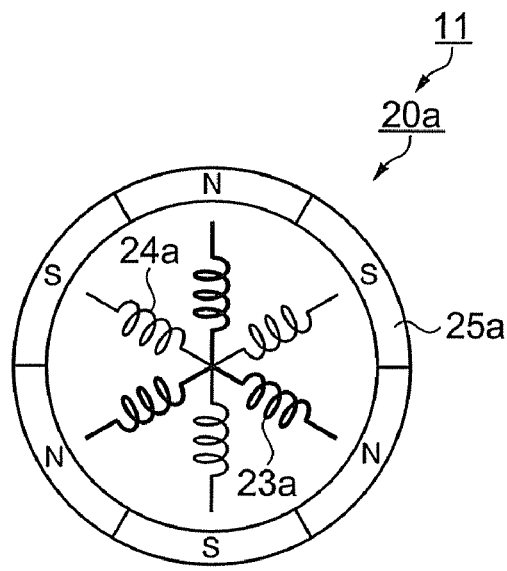
FIG. 6 is a schematic view of a motor driving portion in a second embodiment.

FIG. 6 is a schematic view of a motor driving portion 20a of a brushless motor 11 of a second embodiment of the invention.

In the second embodiment, a bi-directional energizing with a single-phase full-wave is employed and the pole number of a driving coil 23a is larger than that of the first embodiment.

As shown in FIG. 6, the motor driving portion 20a includes the driving coil 23a, a sensor coil 24a and a permanent magnet 25a. The pole number of the sensor coil 24a is the same as that of the driving coil 23a and a sensor coil induced voltage having the same phase of the driving coil induced voltage generated in the driving coil 23a is generated in the sensor coil 24a. The pole number of the permanent magnet 25a is double that of the driving coil 23a.

The second embodiment demonstrates the following effects.

(5) The same effects as those of the first embodiment can be achieved even though the pole numbers of the driving coil 23a and the sensor coil 24a increase.

Third Embodiment

Figure 7:
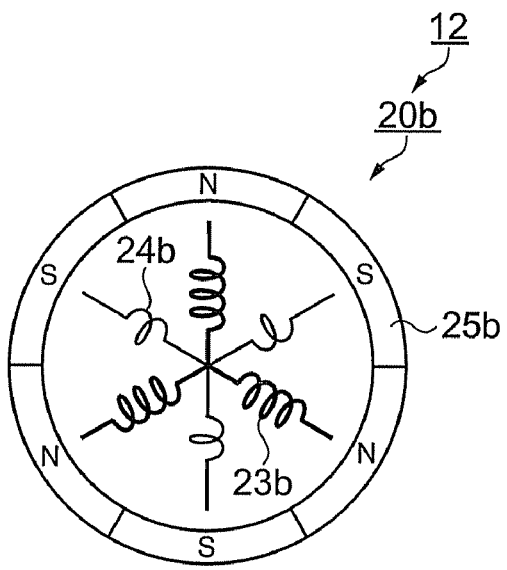
FIG. 7 is a schematic view of a motor driving portion in a third embodiment.

FIG. 7 is a schematic view of a motor driving portion 20b of a brushless motor 12 of a third embodiment of the invention.

In the third embodiment, a bi-directional energizing with a single-phase full-wave is also employed and the number of windings of a sensor coil 24b is decreased. Other than the number of windings of the sensor coil 24b, the brushless motor 12 has the same structure of the second embodiment. The motor driving portion 20b includes a driving coil 23b, the sensor coil 24b and a permanent magnet 25b. The pole number of the sensor coil 24b is the same as that of the driving coil 23b and a sensor coil induced voltage having the same phase of the driving coil induced voltage generated in the driving coil 23b is generated in the sensor coil 24b. The pole number of the permanent magnet 25b is double that of the driving coil 23b.

The third embodiment demonstrates the following effects.

(6) The sensor coil induced voltage generated in the sensor coil 24b has the same phase of the driving coil induced voltage of the driving coil 23b. The waveform, similar to a sine wave, of the sensor coil induced voltage of the sensor coil 24b can be reflected to the driving voltage through the driving circuit. Additionally, the reduction of the number of windings results in the winding materials used being reduced. As a result, costs can be reduced.

Fourth Embodiment

Figure 8:
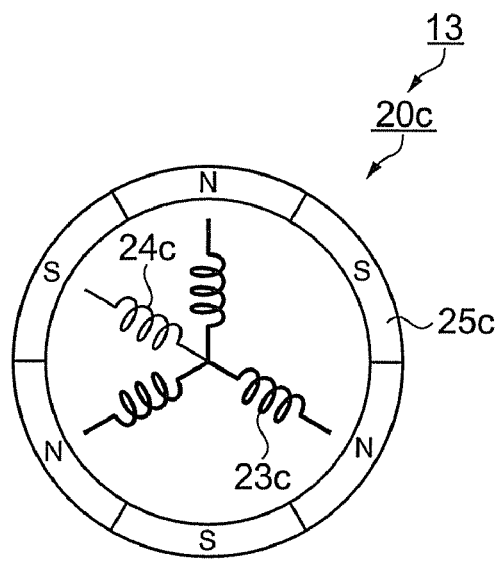
FIG. 8 is a schematic view of a motor driving portion in a fourth embodiment.

FIG. 8 is a schematic view of a motor driving portion 20c of a brushless motor 13 of a fourth embodiment of the invention. In the forth embodiment, a bi-directional energizing with a single-phase full-wave is also employed.

As shown in FIG. 8, the fourth embodiment is a case where the pole number of a sensor coil 24c is smaller than that of a driving coil 23c. Specifically, the pole number of the driving coil 23c is three while the pole number of the sensor coil 24c is one.

The sensor coil 24c is disposed so as to generate a sensor coil induced voltage having the same phase of the driving coil induced voltage generated in the driving coil 23c. The motor driving portion 20c includes a permanent magnet 25c having poles twice as many as those of the driving coil 23c.

The fourth embodiment demonstrates the following effects.

(7) The sensor coil induced voltage generated in the sensor coil 24c has the same phase of the driving coil induced voltage of the driving coil 23c. The waveform, similar to a sine wave, of the sensor coil induced voltage of the sensor coil 24c can be reflected to the driving voltage through the driving circuit. Additionally, the reduction of the number of sensor coils 24c results in materials used for electromagnetic yokes and windings being reduced. As a result, costs can be reduced.

Fifth Embodiment

Figure 9:
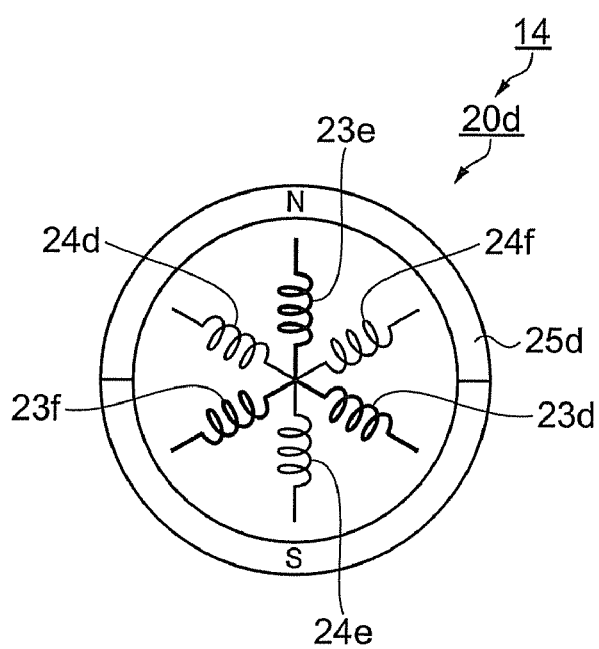
FIG. 9 is a schematic view of a motor driving portion in a fifth embodiment.
Figure 10:
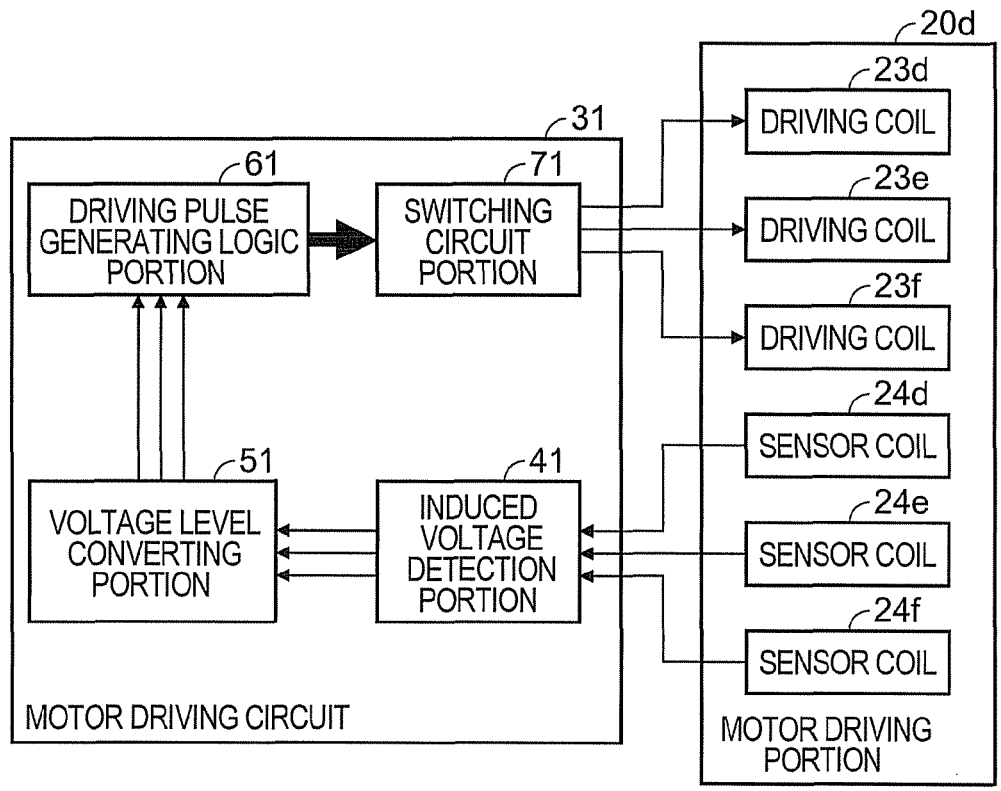
FIG. 10 is a block diagram of the motor driving portion and a motor driving circuit.
Figure 11:
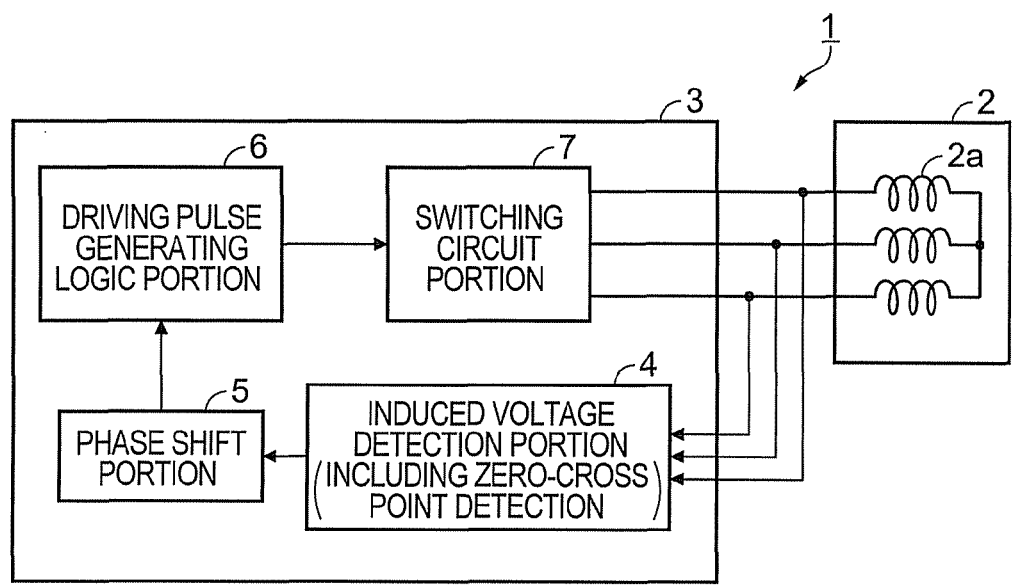
FIG. 11 is a block diagram of a motor driving portion and a motor driving circuit of related art.

FIG. 9 is a schematic view of a motor driving portion 20d of a brushless motor 14 of a fifth embodiment of the invention. FIG. 10 is a block diagram of the motor driving portion 20d. In the fifth embodiment, a bi-directional energizing with a three-phase full-wave is employed.

As shown in FIGS. 9 and 10, a sensor coil 24d is disposed so as to generate a sensor coil induced voltage having the same phase of a driving coil induced voltage generated in a driving coil 23d, a sensor coil 24e is disposed so as to generate a sensor coil induced voltage having the same phase of a driving coil induced voltage generated in a driving coil 23e, and a sensor coil 24f is disposed so as to generate a sensor coil induced voltage having the same phase of a driving coil induced voltage generated in a driving coil 23f, because the waveforms of the driving coil induced voltages of the driving coils 23d, 23e, and 23f are different each other. Additionally, a permanent magnet 25d has two poles.

As shown in FIG. 10, in a motor driving circuit 31, each of the induced voltages generated in the sensor coils 24d, 24e, and 24f is detected in an induced voltage detection portion 41. Each detected signal is converted by a voltage level converting portion 51 so as to meet a driving pulse generating logic portion 61. A driving pulse generating logic portion 61 generates a driving pulse to drive the driving coils based on the converted signals. Based on the driving pulse, a switching circuit portion 71 properly supplies driving voltages such that the induced voltage of the sensor coil 24d is utilized to the driving coil 23d, the induced voltage of the sensor coil 24e is utilized to the driving coil 23e, and the induced voltage of the sensor coil 24f is utilized to the driving coil 23f.

The fifth embodiment demonstrates the following effects.

(8) The same effects as those of the embodiments described above can be achieved also in a driving method with multiple phases since the sensor coils 24d, 24e, and 24f are disposed such that the driving coil induced voltages generated in the driving coils 23d, 2ee, and 23f have the same of the sensor coil induced voltages. The driving coils 23d, 23e, and 23f are driven by respective phases according to the phase number.

The above-described embodiments can be applied to the motor of various apparatuses such as fan motors, timepieces (driving hands), drum washing machines (single rotation), roller coasters, and vibration motors. When the embodiments are applied to fan motors, the effects described above (low power consumptions, low vibrations, low noises, little rotational variations, low heat generations, and long life) are remarkably demonstrated.

Such fan motor can be used for various apparatuses such as digital displays, in-vehicle apparatuses, apparatuses using a fuel battery such as cellular phones with a fuel battery, and projectors. The brushless motors of the embodiments also can be used as motors for various home electronics and electronic apparatuses. For example, the brushless motors of the embodiments can be used as spindle motors of optical memory devices, magnetic memory devices, and polygon mirror driving devices.

An exemplified case where the brushless motors of the embodiments are used for a projector is described with reference to FIG. 12.

Figure 12:
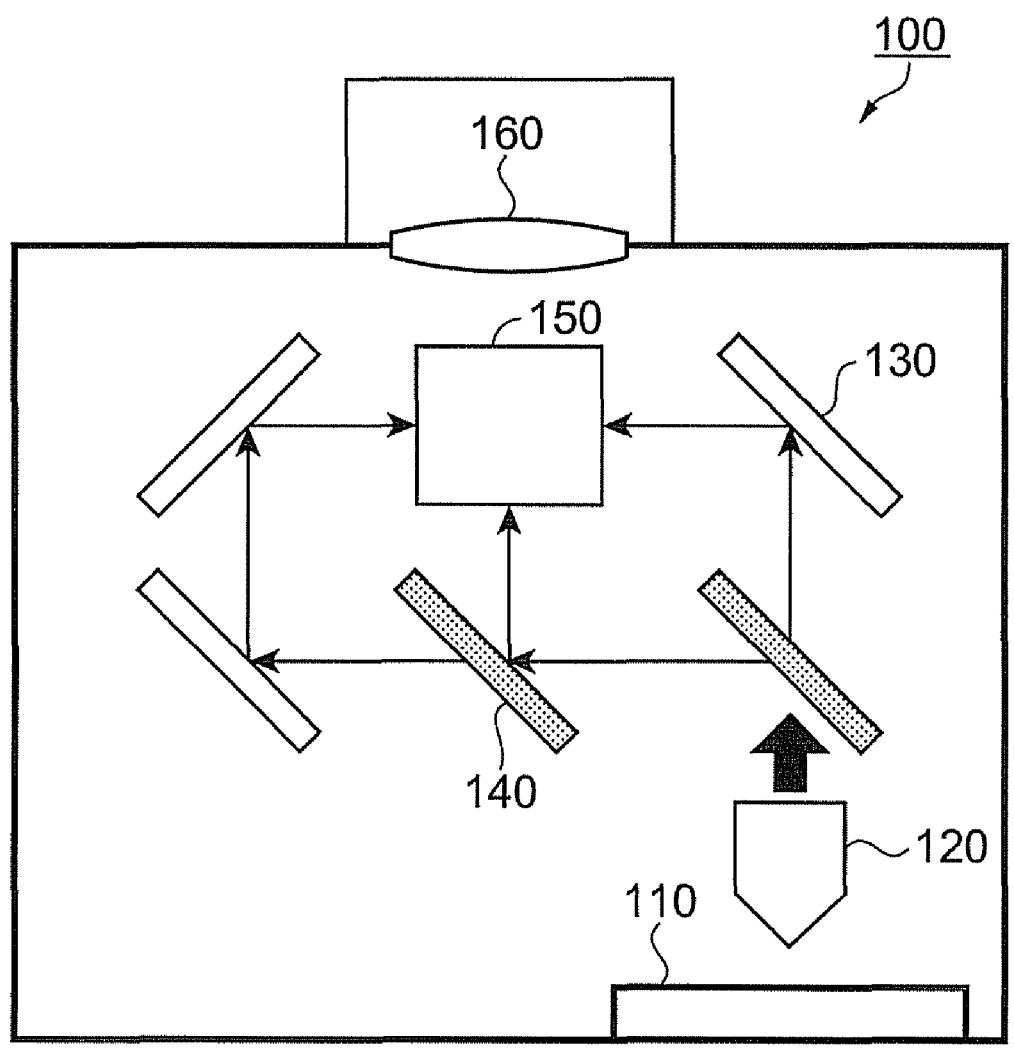
FIG. 12 is a structural view of a projector in which the brushless motor is applied to a fan motor.

FIG. 12 is a structural view of a projector 100 to which any of the brushless motors 10, 12, 13, and 14 of the embodiments is applied as a fan motor 110.

In FIG. 12, light from a light source 120 is decomposed to red, green, and blue light components by a mirror 130 and a dichroic mirror 140. Each of the red, green, and blue light components is transmitted in a liquid crystal display 150 so as to be projected by a projection lens 160. The fan motor 110 is used to properly regulate the temperature of the light source 120.

Figure 13:
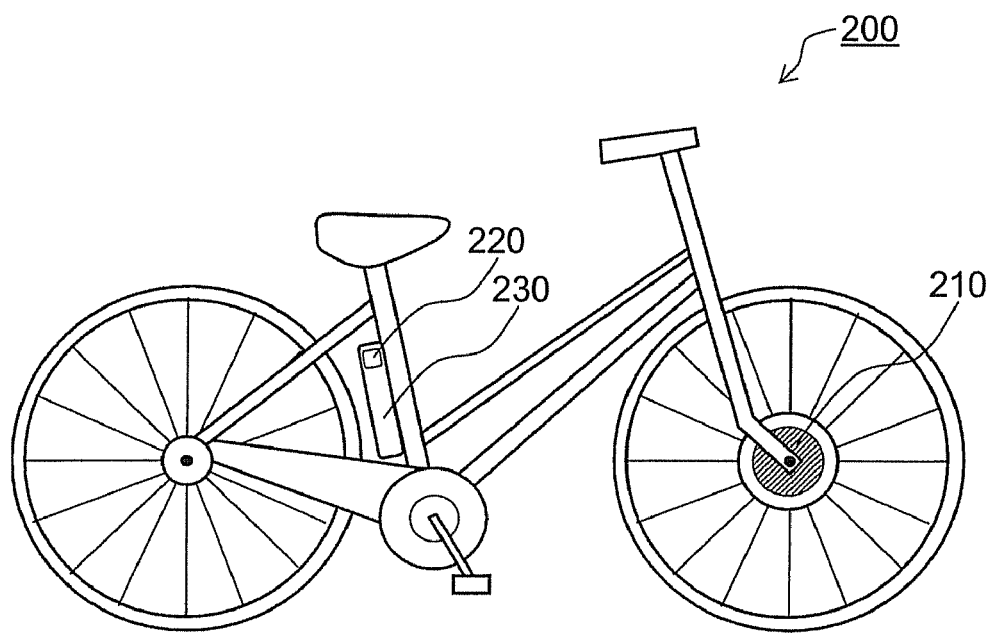
FIG. 13 is a structural view of a bicycle in which the brushless motor is applied.

FIG. 13 is an explanatory view of an electric bicycle (power assist bicycle) 200 as an example of mobile objects using the brushless motors of the embodiments.

The electric bicycle 200 has a motor 210 at the front wheel, and a control circuit 220 and a battery 230 on the frame under the saddle. The motor 210 drives the front wheel by using a power from the battery 230 to assist running. During braking, a power regenerated by the motor 210 is charged in the battery 230. The control circuit 220 controls driving and regeneration of the motor. The motor 210 can employ the various brushless motors described above.

Figure 14:
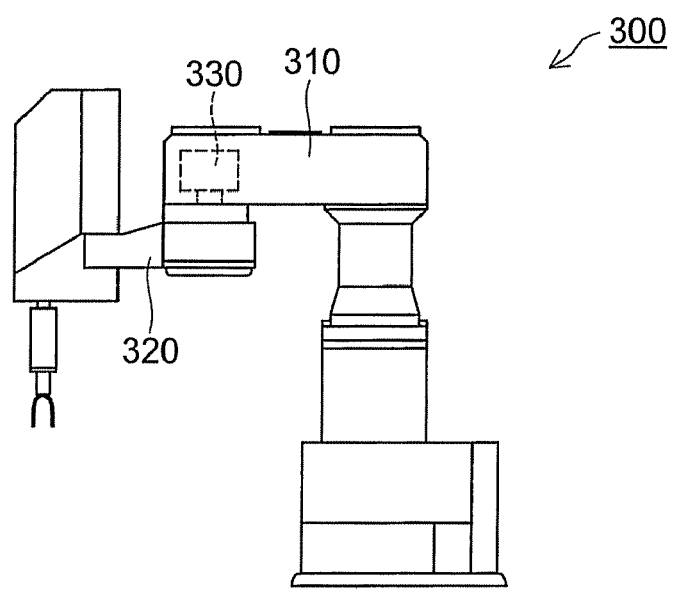
FIG. 14 is a structural view of a robot in which the brushless motor is applied.

FIG. 14 is an exemplified explanatory view of a robot 300 using the brushless motors of the embodiments.

The robot 300 has a first arm 310, a second arm 320, and a motor 330. The motor 330 is used when the second arm 320 is horizontally rotated. The motor 330 can employ the various brushless motors described above.

It should be understood that the invention is not limited to the above-described embodiments but various kinds of modifications can be done other than the embodiments without departing from the spirit. For example, the number of driving coils, sensor coils, and poles are not limited to those exemplarily described in the embodiments.

In addition, the technical scope of the invention is not limited to the descriptions in the embodiments while the invention is described based on the embodiments. Those who are skilled in the art will appreciate that the embodiments can be variously changed and improved. It is apparent from the descriptions of the claims that changed and improved embodiments also can be included in the technical scope of the invention.

What is claimed is:

1. A brushless motor, comprising:
   a permanent magnet;
   a driving coil moving relative to the permanent magnet;
   a sensor coil disposed to the permanent magnet so as to generate a sensor coil induced voltage having a same phase of a driving coil induced voltage generated in the driving coil; and
   a driving circuit applying a driving voltage to the driving coil, the driving voltage having a same phase of the sensor coil induced voltage generated in the sensor coil, wherein
   the driving coil has m poles and is energized by a p-phase driving method where $p \geq 1$, and $m \geq p$,
   the sensor coil induced voltage includes a plurality of sensor coil induced voltages, and the sensor coil has n poles and generates p number of the sensor induced voltages where $m \geq n \geq p$,
   the driving coil induced voltage includes a plurality of driving coil induced voltages and the sensor coil is disposed such that each phase of the p number of the sensor coil induced voltages is equal to a phase of one of the p number of driving coil induced voltages generated in the driving coil, and
   the driving circuit applies the driving voltage having the same phase of the sensor coil induced voltage to the driving coil such that each of the sensor coil induced voltages has the same phase of one of the driving coil induced voltages.

2. The brushless motor according to claim 1, wherein a pole number of the permanent magnet is double the n poles of the sensor coil.

3. The brushless motor according to claim 1, wherein the driving circuit applies the driving voltage having the same phase and a nearly same waveform of the sensor coil induced voltage to the driving coil.

4. The brushless motor according to claim 3, wherein the driving circuit includes a pulse width modulation unit to perform pulse-width-modulation control for the sensor coil induced voltage.

5. The brushless motor according to claim 1, wherein the n poles of the sensor coil is less than the m poles of the driving coil.

6. The brushless motor according to claim 1, wherein a winding number of the sensor coil is less than a winding number of the driving coil.

* * * * *